United States Patent
Kapinos et al.

(10) Patent No.: US 11,367,440 B2
(45) Date of Patent: Jun. 21, 2022

(54) DIGITAL ASSISTANT IN-CALL PRESENTER

(71) Applicant: Lenovo (Singapore) Pte. Ltd., Singapore (SG)

(72) Inventors: Robert J. Kapinos, Durham, NC (US); Scott W. Li, Cary, NC (US); Russell Speight VanBlon, Raleigh, NC (US); Robert Norton, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 251 days.

(21) Appl. No.: 16/563,440

(22) Filed: Sep. 6, 2019

(65) Prior Publication Data

US 2021/0074284 A1 Mar. 11, 2021

(51) Int. Cl.
*G10L 15/22* (2006.01)
*H04L 12/18* (2006.01)
*G10L 15/30* (2013.01)

(52) U.S. Cl.
CPC .............. *G10L 15/22* (2013.01); *G10L 15/30* (2013.01); *H04L 12/1818* (2013.01); *H04L 12/1822* (2013.01); *G10L 2015/223* (2013.01)

(58) Field of Classification Search
None
See application file for complete search history.

(56) References Cited

U.S. PATENT DOCUMENTS

| 6,363,352 | B1 | 3/2002 | Dailey et al. | |
|---|---|---|---|---|
| 2014/0181741 | A1* | 6/2014 | Apacible | G06Q 10/109 |
| | | | | 715/810 |
| 2014/0317502 | A1 | 10/2014 | Brown et al. | |
| 2016/0234264 | A1 | 8/2016 | Coffman et al. | |
| 2019/0319811 | A1* | 10/2019 | Mahmoud | G06F 40/205 |
| 2019/0392395 | A1* | 12/2019 | Valliani | G06Q 10/1095 |
| 2020/0304643 | A1* | 9/2020 | Abraham | H04M 3/567 |

OTHER PUBLICATIONS

Panchapakesan et al. Method for storing and retrieving Mar. 27, 2015.*
United States Patent and Trademark Office, Office Action for U.S. Appl. No. 16/563,470, dated Jun. 23, 2020, 10 pages.

* cited by examiner

*Primary Examiner* — Quynh H Nguyen
(74) *Attorney, Agent, or Firm* — VanLeeuwen & VanLeeuwen; Jason A. Friday (57) ABSTRACT

An approach is provided that uses a digital assistant during an online meeting. The digital assistant receives a request to attend an online meeting at a scheduled date and time. The digital assistant is associated with a user that is invited to attend the online meeting. The digital assistant is automatically logged onto the online meeting over the computer network when the scheduled date and time arrive. During the online meeting, the digital assistant detects a voice command from one the human participants of the online meeting. The digital assistant detects that the voice command is detected to the digital assistant. The digital assistant then performs a function that corresponds to the detected voice command.

17 Claims, 9 Drawing Sheets

DIGITAL ASSISTANT IN-CALL PRESENTER

BACKGROUND

A digital assistant (DA) is a software agent that can perform tasks or services for an individual based on verbal commands. Digital assistants are able to interpret human speech and respond via synthesized voices. Users can ask their digital assistants questions, control home automation devices and media playback via voice. Digital assistants may work via text messages, such as in an online chat discussion, by receiving and responding to vocal commands, as well as other interfaces, such as image processing. Digital assistants use natural language processing (NLP) to identify and respond to commands that are directed to the digital assistant. Traditional digital assistants responds to commands to provide information or facts (e.g., weather, etc.) retrieved by the DA from online sources, set alarms, and assist the user in making to-do and shopping lists.

SUMMARY

An approach is provided that uses a digital assistant during an online meeting. The digital assistant receives a request to attend an online meeting at a scheduled date and time. The digital assistant is associated with a user that is invited to attend the online meeting. The digital assistant is automatically logged onto the online meeting over the computer network when the scheduled date and time arrive. During the online meeting, the digital assistant detects a voice command from one the human participants of the online meeting. The digital assistant detects that the voice command is detected to the digital assistant. The digital assistant then performs a function that corresponds to the detected voice command.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages will become apparent in the non-limiting detailed description set forth below.

BRIEF DESCRIPTION OF THE DRAWINGS

This disclosure may be better understood by referencing the accompanying drawings, wherein.

DETAILED DESCRIPTION

FIGS. 1-9 shows an approach that utilizes a digital assistant (DA) to assist participants of an online meeting. In one embodiment, the digital assistant is invited to the conference call as a participant with media sharing access. The digital assistant can be programmed to have skills that allow it to interact with various applications, such as presentation software. The digital assistant can also act as a "bot" for the user's computing device. In another embodiment, the digital assistant has the ability to surface material directly from a storage location, such as a cloud drive, into the online meeting collaboration area without any of the participants otherwise using a computing device to access the material. A user instructs the digital assistant by speaking in the call to direct commands to the digital assistant, such as asking the digital assistant to show particular material to the online meeting participants. Once shown, the user can instruct the digital assistant to navigate through the presented material. The digital assistant responds by showing the desired portion of the material (e.g., document, etc.) in the online meeting shared media (collaboration) area.

The digital assistant has voice recognition capabilities that enable the digital assistant to use natural language processing (NLP) to understand user commands. In one embodiment, the digital assistant is enabled with calendar access, the ability to make phone calls, and the ability to speak using a synthesized voice and also to listen to the participants speaking during an online meeting. A digital assistant skill is made that can observe a calendar and have the digital assistant dial into conference calls based on that calendar. In one embodiment, the data has full access to a specific user's calendar and operates on a configured set of meetings. In another embodiment, the digital assistant works based on only those meeting invitations sent to a digital assistant specific e-mail address.

The digital assistant skill observes when the person (or the digital assistant itself) is meeting leader from the calendar. If the meeting time arrives and the digital assistant's user has joined the meeting, the digital assistant joins the meeting in place of the user and opens the bridge allowing other participants to conduct the online meeting. If the digital assistant's user is the meeting leader, the digital assistant joins the online meeting as the leader and admits and manages participants to the online meeting. The digital assistant also reacts based on in-call voice requests from participants. The digital assistant performs various online meeting tasks such as admitting users waiting in a lobby, managing presenters, and flipping through pre-prepared meeting material slides.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Figure 1:
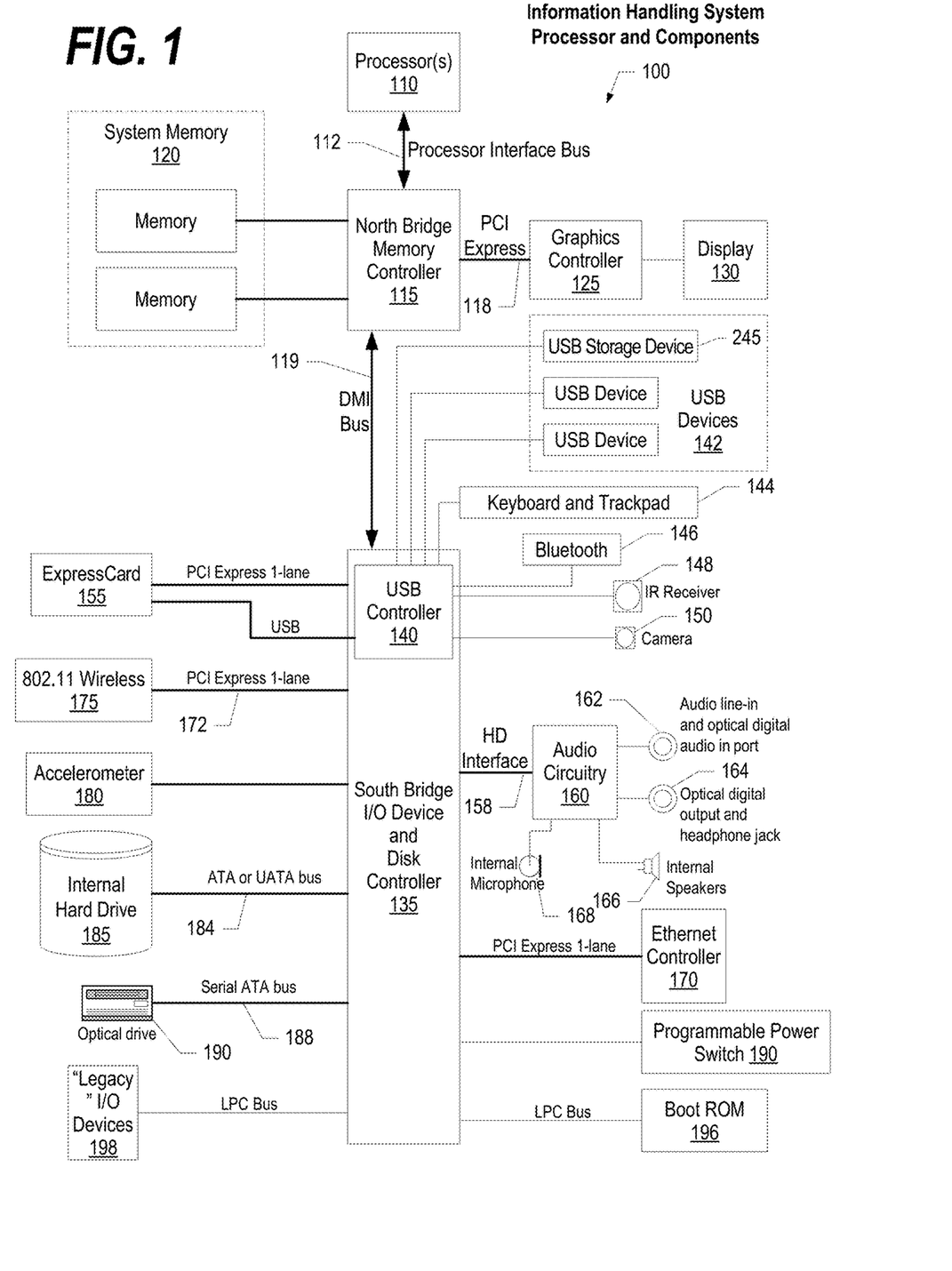
FIG. 1 is a block diagram of a data processing system in which the methods described herein can be implemented.
Figure 2:
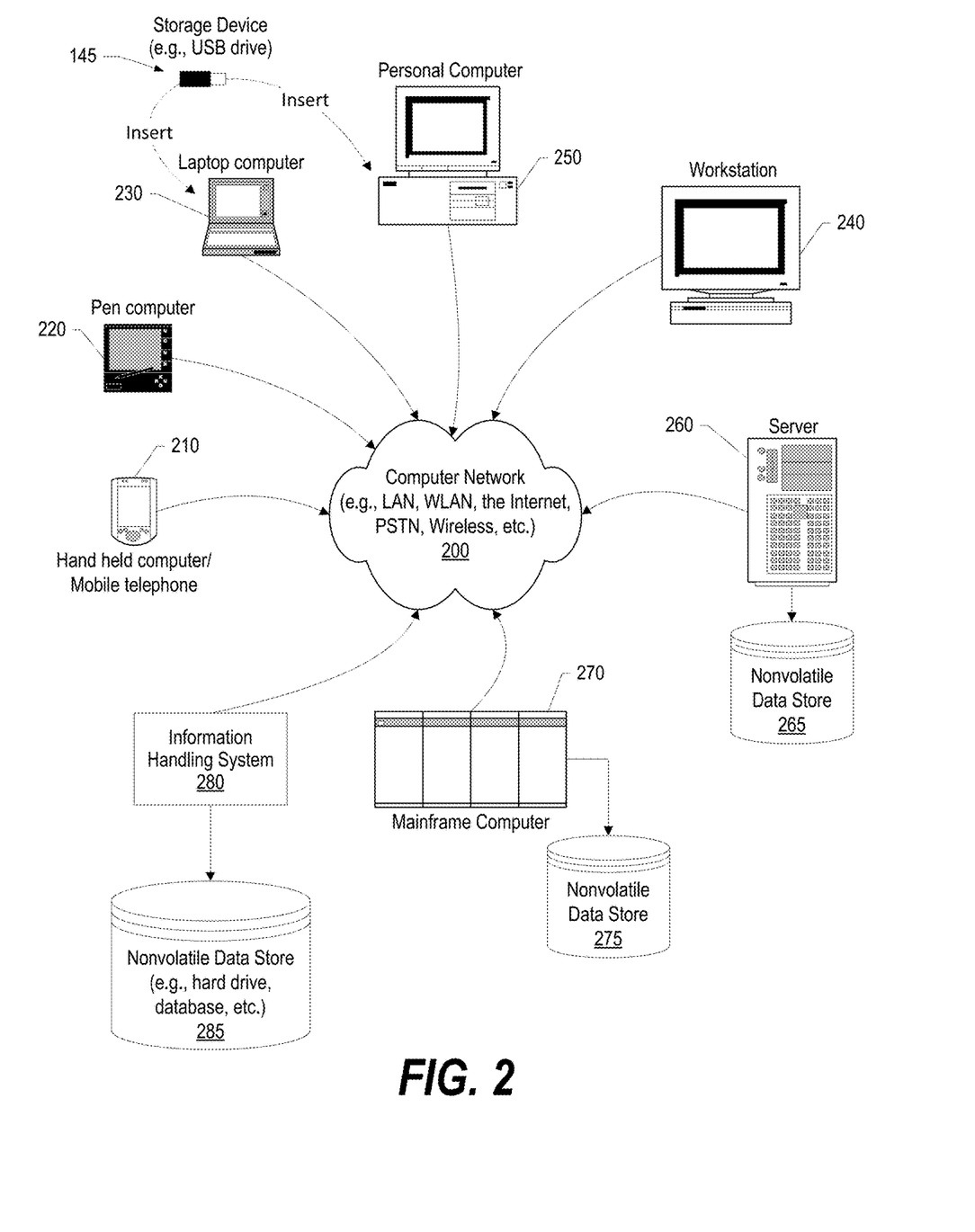
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a device that is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Accelerometer 180 connects to Southbridge 135 and measures the acceleration, or movement, of the device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may be a device that can take many forms. For example, an information handling system may take the form of a desktop device, server device, portable device, laptop device, notebook device, or other form factor device. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of devices that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling system devices include pen, or tablet, device 220, laptop, or notebook, device 230, workstation device 240, personal computer system device 250, and server device 260. Other types of information handling system devices that are not individually shown in FIG. 2 are represented by information handling system device 280. As shown, the various information handling system devices can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
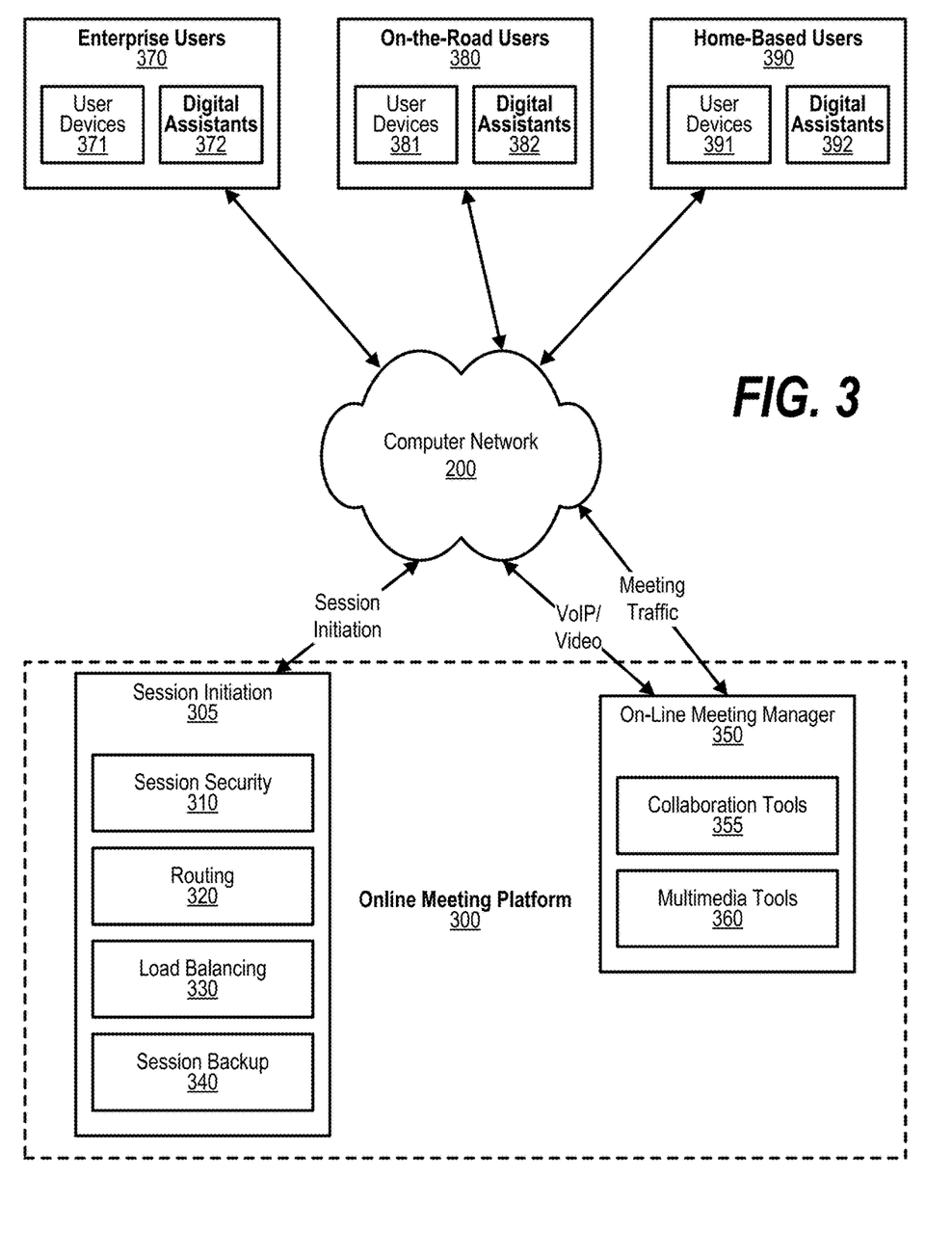
FIG. 3 is a component diagram depicting the components used in utilizing a digital assistant during an online meeting.

FIG. 3 is a component diagram depicting the components used in utilizing a digital assistant during an online meeting. Online meeting platform 300 is used to initiate (establish) an online meeting as well as conduct the online meeting by allowing collaboration between the meeting participants. Online meeting platform includes session initiation processes 305 as well as online meeting management processes 350.

An online meeting uses session initiation processes 305 to initiate the sessions in the online meeting. These session initiation processes include session security process 310 that maintains the security of the online meeting so that others outside of the online meeting are able to gain access to the discussion and content shared during the online meeting. Routing process 320 routes the sessions of an online meeting to a common location. Load balancing process 330 balances the online meeting site's load amongst the various systems, such as servers, utilized by the online meeting service. Load balancing might move an online meeting to a different server to better serve the users of the online meeting and reduce issues that can arise when an online meeting site is overloaded. Session backup process 340 is used in some online meeting services to provide backup services for the online meetings conducted on the online meeting platform.

While session initiation processes 305 are used during online meeting session initiation, in some embodiments the actual online meeting is performed by the online meeting manager processes 350. Once an online meeting session is established between participants (users 370, 380, and 390), online meeting manager processes 350 are used to share voice data (Voice over IP, or "VoIP"), and video data, such as presentation materials shared amongst the participants of the online meeting. The actual meeting traffic is between the various online participants and the online meeting platform as provided by the online meeting management processes. These processes include collaboration tools 355 that are used to provide an area of the online meeting where materials, such as presentations and the like, can be shared and discussed amongst the participants. In addition, multimedia tools 360 are also provided by the online meeting manager to provide additional multimedia capabilities and functions used to share and collaborate amongst the participants.

While traditional online meetings are limited to human participants, the approach described herein allows the human participants to have digital assistants that can attend the online meeting. Digital assistants can attend in addition to the human participant that is associated with the respective digital assistant also attending or, in one embodiment, the digital assistant can attend in lieu of the associated user of the digital assistant. Many different types of users can participate in an online meeting. These different types of users can include enterprise users 370 (e.g., working in an office environment, etc.), on-the-road users 380 (e.g., working out of a hotel, etc.), and home-based users 390 (e.g., working from the user's home, etc.). Each of the different types of users is shown including one or more user devices (371, 381, and 391, respectively) which are information handling systems utilized by the human users to participate in an online meeting, such as a laptop computer system, a tablet computer system, a smart phone, etc. In addition, each different type of user can also include a digital assistant (372, 382, and 392, respectively). While shown together, however, the human participant and the user device the participant utilizes to participate in an online meeting can be at an entirely different location from their respective digital assistant. For example, an on-the-road user might use his laptop to participate in an online meeting, while the same user's digital assistant might be located at an enterprise where the user works or at the user's home if the user is generally a home-based user. During an online meeting, the human participant can participate in the online meeting as well as the user's digital assistant. In addition, as mentioned previously, if the user cannot attend the online meeting (e.g., due to another meeting, conflict, etc.) the user can set up his or her digital assistant to attend the online meeting so that some inputs that would be provided by the user (e.g., presentation materials, etc.) can be provided by the user's digital assistant.

Figure 4:
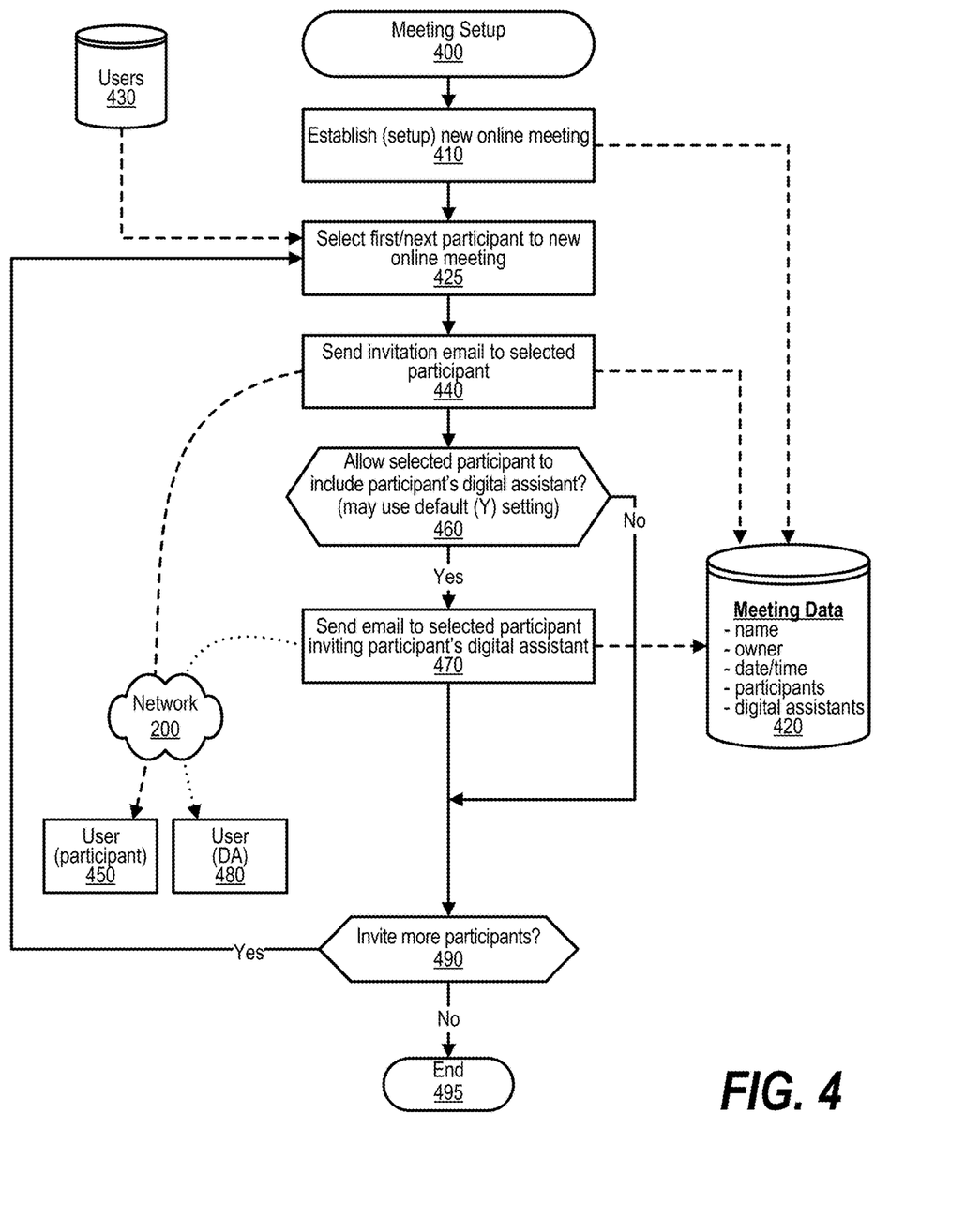
FIG. 4 is a flowchart showing steps taken by a process that sets up a meeting with one or more digital assistants being participants of the meeting.

FIG. 4 is a flowchart showing steps taken by a process that sets up a meeting with one or more digital assistants being participants of the meeting. FIG. 4 processing commences at 400 and shows the steps taken by a process that is used to setup an online meeting. At step 410, the process establishes, or sets up, a new online meeting my storing meeting details in data store 420. These details include a name or identifier of the online meeting, the owner, or host, of the online meeting, and the scheduled date and time of the online meeting. In addition, as gathered, the online meeting data will also include the list of participants to the online meeting as well as the list of data stores invited to the online meeting. In one embodiment, more than one digital assistant can be included in the meeting with each digital assistant associated with a different invitee to the meeting. Also, in one embodiment, the user (human invitee) does not have to actually attend the online meeting even if the user's associated digital assistant attends and participates in the online meeting.

At step 425, the process selects the first participant that the user wishes to invite to the new online meeting. The participant (invitee) is selected from data store 430 that is a list of possible users to invite, such as a company online directory. At step 440, the process sends an invitation email to the selected participant. The user's identifier is stored in data store 420 as one of the possible participants of the online meeting. The email is transmitted through computer network 200, such as the Internet, to user 450 where it is received on the user's device, such as the user's tablet, computer, or smart phone. The process determines as to whether the person setting up the online meeting wishes to allow the selected participant to include the participant's digital assistant in the online meeting (decision 460). If the digital assistant is allowed to attend the online meeting, then decision 460 branches to the 'yes' branch whereupon at step 470, the process sends an email to the selected participant inviting the participant's digital assistant 480 to the online meeting. On the other hand, if the digital assistant is not allowed to attend the meeting, then decision 460 branches to the 'no' branch bypassing step 470. The process determines whether the user setting up the online meeting wishes to invite more participants to the meeting (decision 490).

If more participants are being invited to the meeting, then decision 490 branches to the 'yes' branch which loops back to step 425 to select and process the next user to invite to the online meeting. This looping continues until there are no more users to invite to the online meeting, at which point decision 490 branches to the 'no' branch exiting the loop. FIG. 4 processing thereafter ends at 495.

Figure 5:
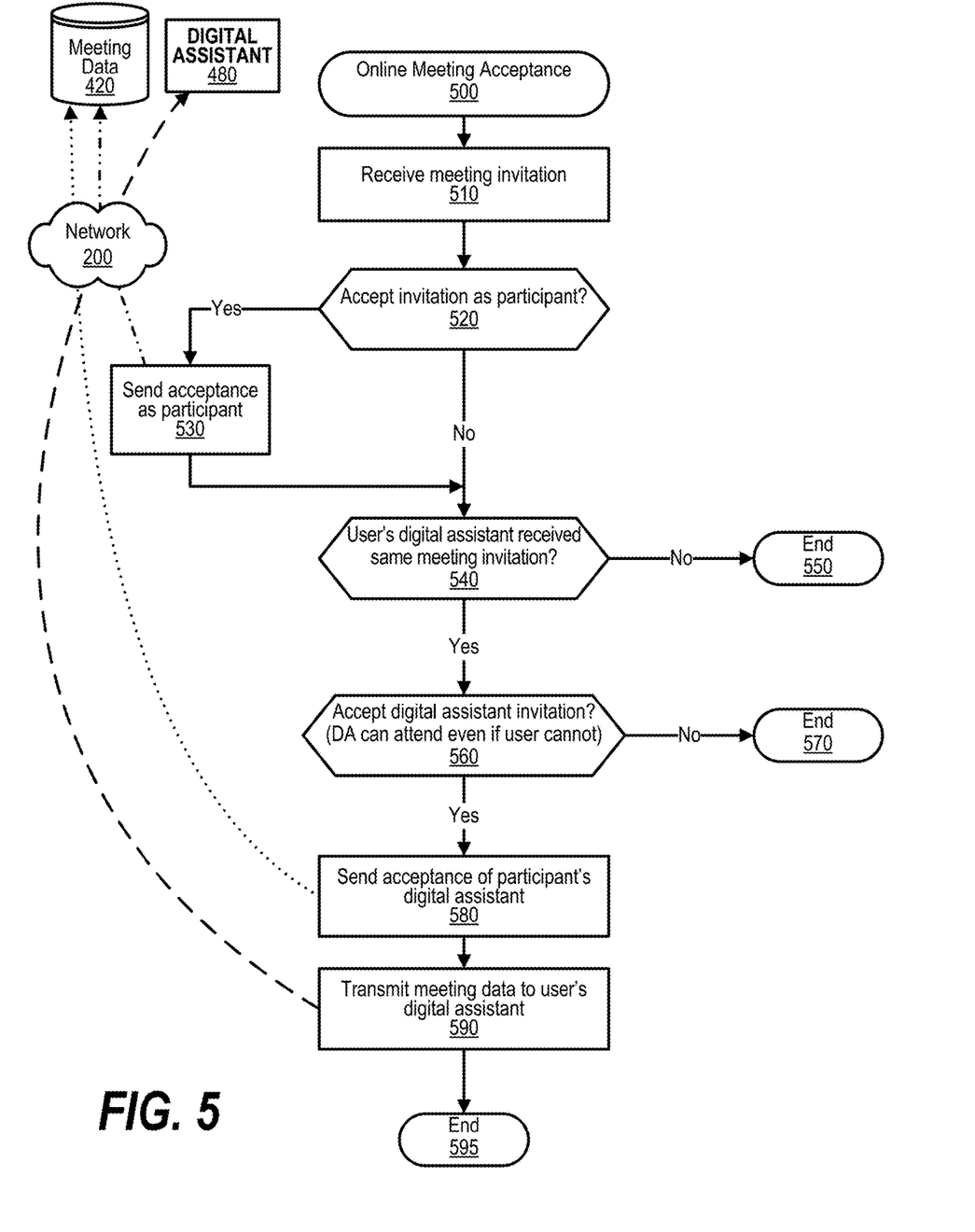
FIG. 5 is a flowchart showing steps taken by a process that performs online meeting acceptance by a digital assistant.

FIG. 5 is a flowchart showing steps taken by a process that performs online meeting acceptance by a digital assistant. FIG. 5 processing commences at 500 and shows the steps taken by a process that is used to accept online meeting invitations. At step 510, the process receives a meeting invitation that was issued by the organizer of the meeting as described in FIG. 4. The invitee (human) determines as to whether to accept the invitation to the online meeting as a human participant (decision 520). If the user is accepting the invitation as an actual human participant, then decision 520 branches to the 'yes' branch whereupon, at step 530, the process sends an acceptance as a participant which is recording in data store 420 of participants that plan on attending the online meeting. On the other hand, if the user does not accept the invitation as a participant, then decision 520 branches to the 'no' branch bypassing step 530.

The process determines as to whether the user's digital assistant also received a meeting invitation to the same online meeting (decision 540). If the user's digital assistant was also invited to the online meeting, then decision 540 branches to the 'yes' branch to perform steps 560 through 595. On the other hand, if the user's digital assistant was not invited to the online meeting, then decision 540 branches to the 'no' branch and processing ends at 550.

Steps 560 through 595 are performed when the user's digital assistant has been invited to the online meeting. The user associated with the digital assistant decides whether to have his or her digital assistant attend the online meeting (decision 560). If the user accepts the digital assistant's invitation to the online meeting, then decision 560 branches to the 'yes' branch to perform steps 580 through 595. On the other hand, if the user decides to not have his or her associated digital assistant attend the online meeting, then decision 560 branches to the 'no' branch and processing ends at 570. Steps 580 through 595 are performed when the user has chosen to have his or her associated digital assistant attend the online meeting. At step 580, the process sends an acceptance of the invitation indicating that the participant's digital assistant will attend the online meeting. At step 590, the process transmits the online meeting data to the user's digital assistant so that the user has details of the online meeting as well as an instruction to attend the online meeting. FIG. 5 processing thereafter ends at 595.

Figure 6:
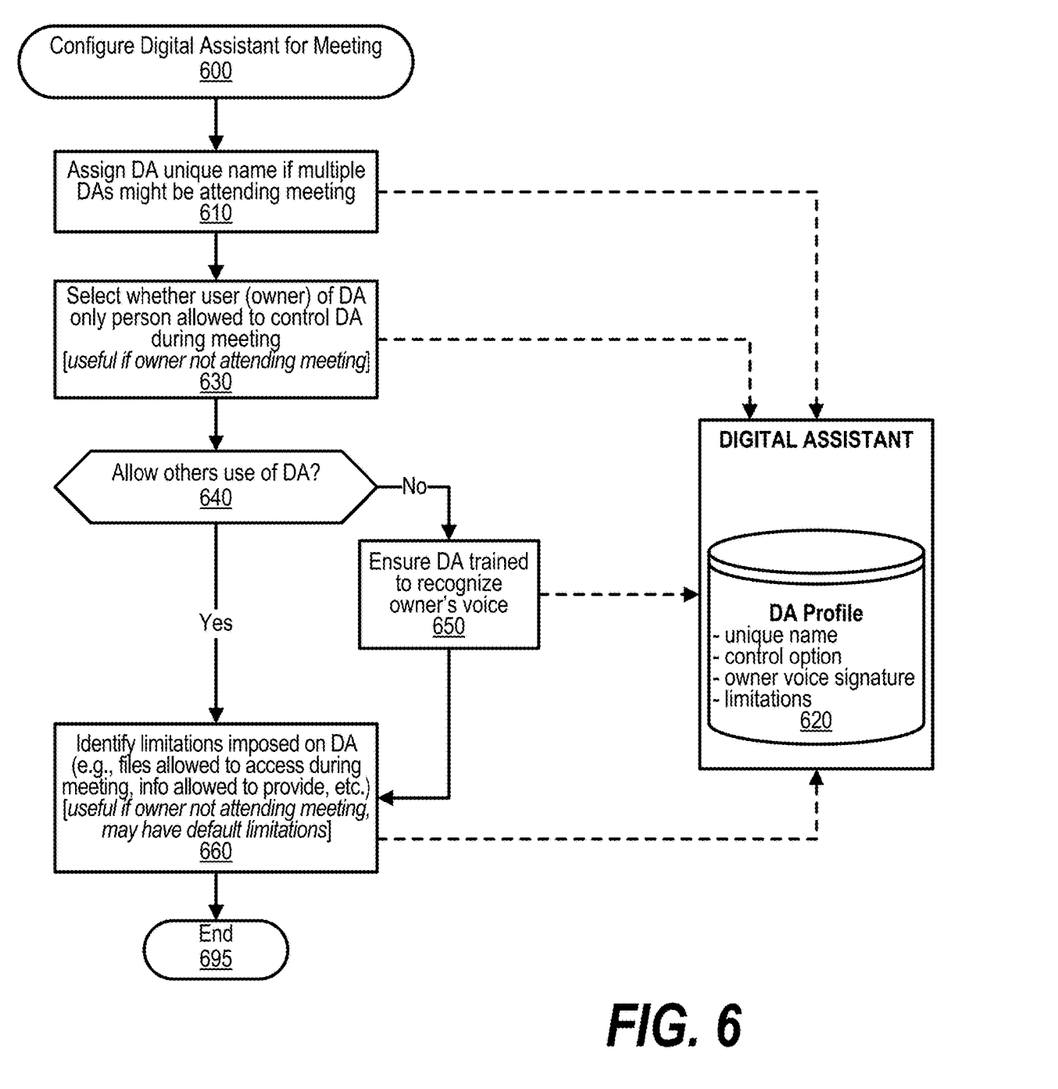
FIG. 6 is a flowchart showing steps taken by a process that configures a digital assistant for an upcoming online meeting.

FIG. 6 is a flowchart showing steps taken by a process that configures a digital assistant for an upcoming online meeting. FIG. 6 processing commences at 600 and shows the steps taken by a process that configures a digital assistant for attending an online meeting. At step 610, the process assigns the digital assistant a unique name, if not already assigned, to distinguish the digital assistant from other digital assistants if multiple digital assistants might be attending the online meeting. For example, a digital assistant associated with a user named "Rob" might have a named assigned as "Rob's digital assistant." The unique name is provided to the digital assistant and stored in the digital assistant's profile (data store 620).

At step 630, the process selects whether the user (owner) of the digital assistant is the only person allowed to control the digital assistant during the online meeting. The owner of the digital assistant is the person that is associated to the digital assistant. Allowing others to use to the digital assistant can prove to be useful if the digital assistant's owner will not be attending the online meeting so that others attending the online meeting might be able to receive information controlled by the digital assistant's owner. This control option is also included in the digital assistant profile that is stored in data store 620. If others are not allowed use of the owner's digital assistant, then decision 640 branches to the 'no' branch whereupon, at step 650, the process ensures that the digital assistant is trained to recognize owner's voice or use some other identifier that distinguishes the digital assistant's owner from other participants in the online meeting. This voice signature is also included in the digital assistant profile that is stored in data store 620. On the other hand, if others are allowed to use the digital assistant, then decision 640 branches to the 'no' branch bypassing step 650.

At step 660, the process prompts the user (owner of the digital assistant) to identify limitations imposed on the digital assistant during the online meeting. For example, the digital assistant may be limited to only access to particular electronic files or folders during meeting, may only be able to provide certain types of information (e.g., presentation files but not spreadsheets, etc.). These limitations are useful if the digital assistant's owner will not be attending the online meeting. In addition, default limitations may be set up by the digital assistant's owner and changed depending on the audience and subject matter of a particular meeting. These limitations are also included in the digital assistant profile that is stored in data store 620. FIG. 6 processing thereafter ends at 695.

Figure 7:
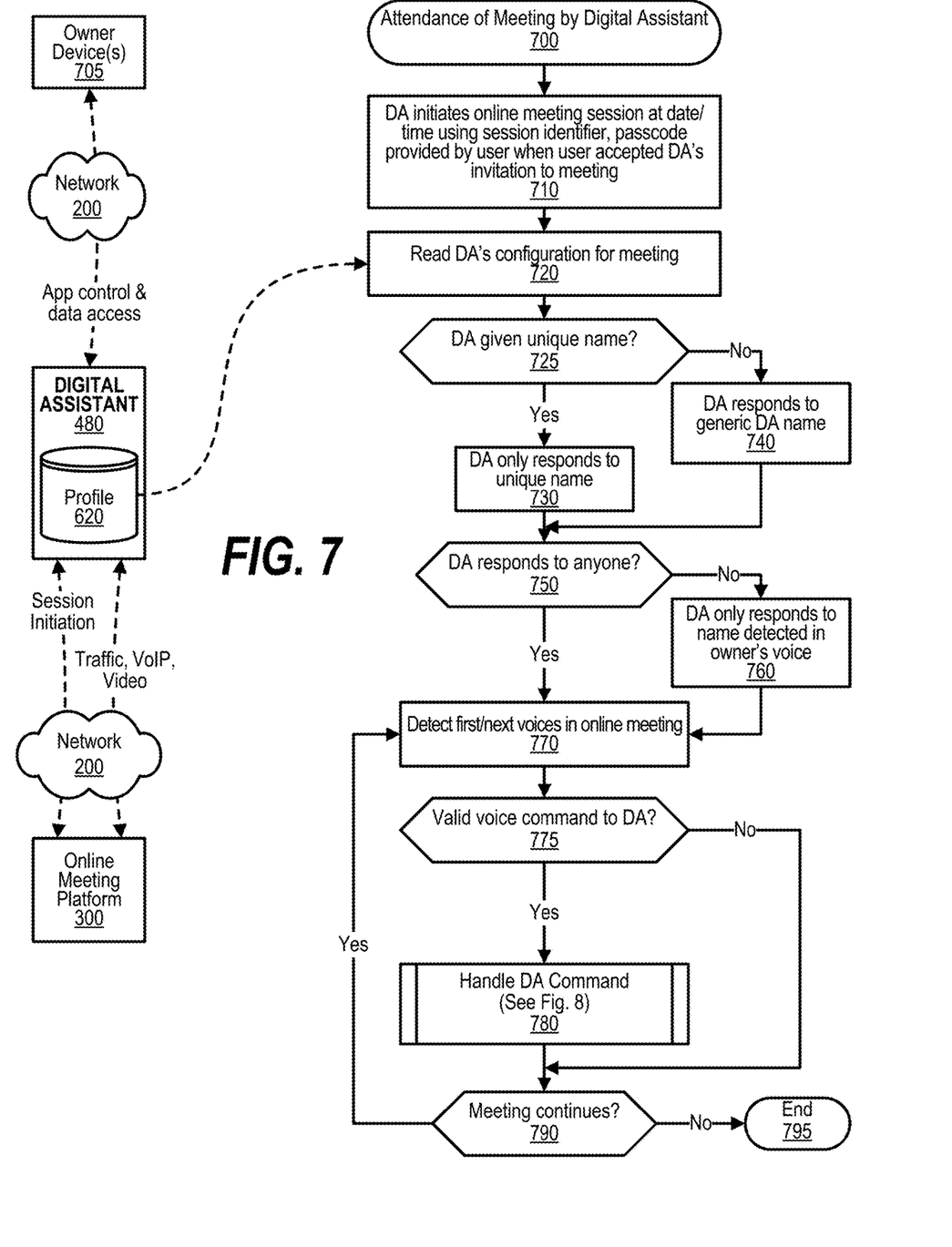
FIG. 7 is a flowchart showing steps taken by a process that manages the attendance of an online meeting by a digital assistant.

FIG. 7 is a flowchart showing steps taken by a process that manages the attendance of an online meeting by a digital assistant. FIG. 7 processing commences at 700 and shows the steps taken by a process that is performed during the attendance of an online meeting by a digital assistant. At step 710, the digital assistant initiates an online meeting session at the scheduled date and time of the online meeting using an online meeting (session) identifier and passcode that was provided when the digital assistant was invited to the online meeting.

At step 720, the process reads the digital assistant's profile (configuration) for use in the online meeting with the profile being read from data store 620. The process determines as to whether the digital assistant has been given a unique name as set forth in the profile (decision 725). If the digital assistant has been given a unique name, then decision 725 branches to the 'yes' branch whereupon, at step 730, the digital assistant is set to only respond to the unique name that was provided. On the other hand, if the digital assistant was not given a unique name, then decision 725 branches to the 'no' branch whereupon, at step 740, the digital assistant is set to respond to the generic name assigned to the digital assistant.

The process determines as to whether the digital assistant has been configured to respond to anyone or to just the digital assistant's owner (decision 750). If the digital assistant has been configured to respond to anyone, then decision 750 branches to the 'yes' branch bypassing step 760. On the other hand, if the digital assistant has been configured to only respond to the digital assistant's owner, then decision 750 branches to the 'no' branch whereupon, at step 760, the digital assistant is set to only respond to its name (unique or generic) when detected in the digital assistant owner's voice.

At step 770, the process detects the first voices in online meeting. The process determines as to whether the detected voice is a valid voice command to the digital assistant based on the configured settings of the digital assistant described above (decision 775). If a valid voice command to the digital assistant is detected, then decision 775 branches to the 'yes' branch whereupon, at predefined process 780, the process performs the Handle Digital Assistant Command routine (see FIG. 8 and corresponding text for processing details). On the other hand, if a valid voice command to the digital assistant is not detected, then decision 775 branches to the 'no' branch bypassing predefined process 780. The process continually determines whether the online meeting is continuing (decision 790). If the online meeting is continuing, then decision 790 branches to the 'yes' branch which loops back to step 770 to continue monitoring for valid commands to the digital assistant. This looping continues until the meeting terminates, at which point decision 790 branches to the 'no' branch exiting the loop. FIG. 7 processing thereafter ends at 795.

Figure 8:
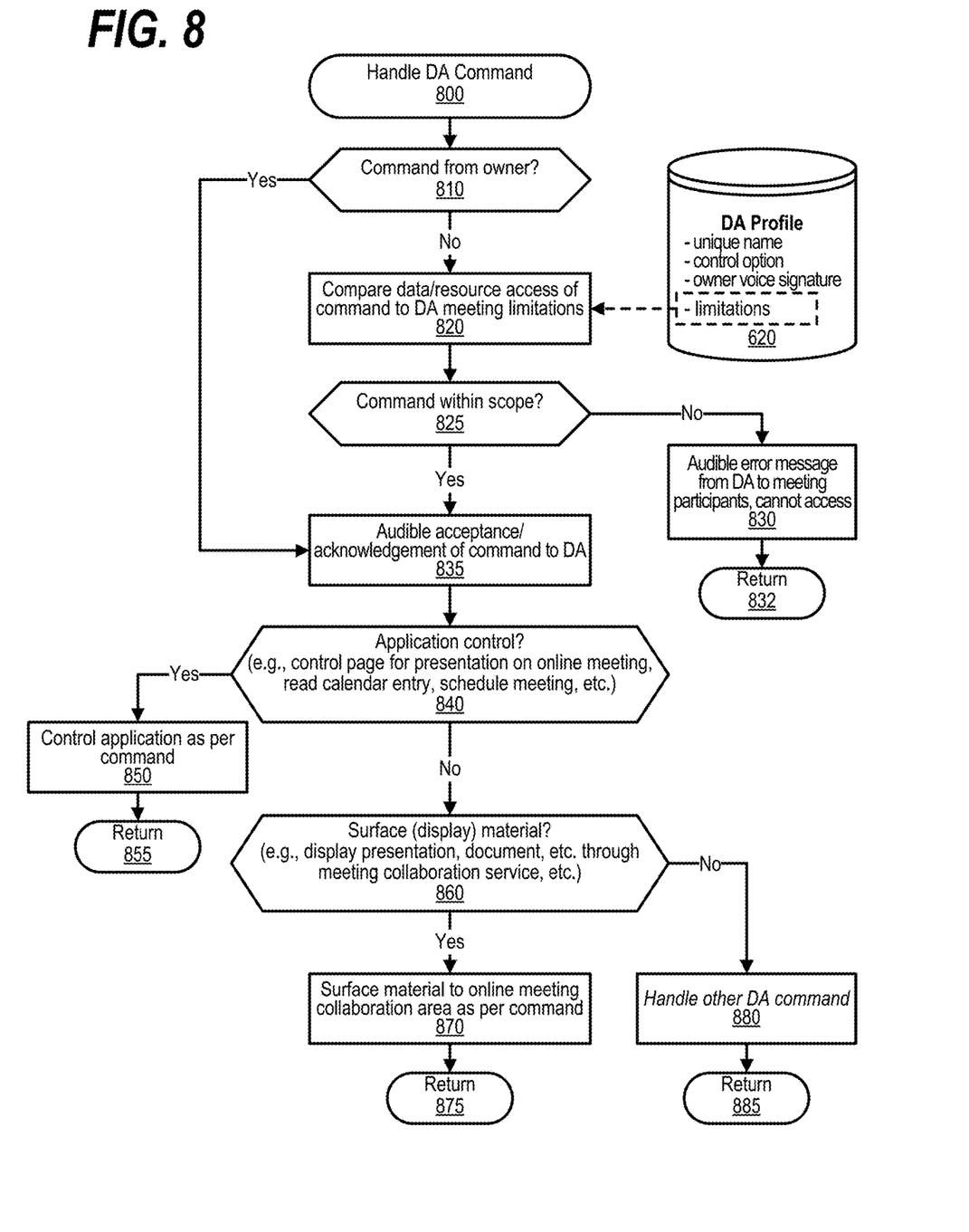
FIG. 8 is a flowchart showing steps taken by a process that handles incoming commands directed to a digital assistant during an online meeting.

FIG. 8 is a flowchart showing steps taken by a process that handles incoming commands directed to a digital assistant during an online meeting. FIG. 8 processing commences at 800 and shows the steps taken by a process that handles commands directed to the digital assistant. The process determines as to whether the received command is from the owner of the digital assistant (decision 810, e.g., based on analysis of the vocal qualities of the voice that issued the command, etc.). If the command is from the digital assistant's owner, then decision 810 branches to the 'yes' branch bypassing steps 820 through 832. On the other hand, if the command was not from owner but a valid (accepted) command from another participant of the online meeting, then decision 810 branches to the 'no' branch to perform steps 820 through 832.

Steps 820 through 832 are performed when a non-owner issues a command to the digital assistant. At step 820, the process compares the data and/or resource access required to complete the command to the digital assistant's online meeting limitations that were configured and included in the digital assistant profile that is retrieved from data store 620. The process determines as to whether the command calls within the scope of acceptable commands given the command and data that needs to be accessed to perform the command (decision 825). If the command is within the scope established for the digital assistant, then decision 825 branches to the 'yes' branch to complete the command. On the other hand, if the command is not within the scope established for the digital assistant, then decision 825 branches to the 'no' branch whereupon, at step 830, an audible error message is sent from the digital assistant to the meeting participants indicating that the command cannot be completed and processing returns to the calling process (see FIG. 7) at 832.

When the command is within the scope established for the digital assistant, or the command is from the digital assistant's owner, then at step 835, the digital assistant sends an audible acceptance and/or acknowledgement of the command to the participants of the online meeting. The process determines as to whether the command to the digital assistant is an application control command (decision 840). If the command to the digital assistant is an application control command, then decision 840 branches to the 'yes' branch whereupon, at step 850, the process controls the application (e.g., control page for presentation in collaboration area of the online meeting, reading a calendar entry, scheduling a meeting, or the like, and processing returns to the calling routine (see FIG. 7) at 855. On the other hand, if the command is not an application control command, then decision 840 branches to the 'no' branch for further processing.

The process determines as to whether the command is to surface (display) material onto the collaboration area of the online meeting so that the material is visible to the participants of the online meeting (decision 860). If the command is a surface material command, then decision 860 branches to the 'yes' branch whereupon, at step 870 the process surfaces the requested material (e.g., presentation, document, spreadsheet, etc.) to the online meeting participants using the online meeting collaboration area as per the received command with processing returning to the calling routine (see FIG. 7) at 875. On the other hand, if the command is not a surface material command, then decision 860 branches to the 'no' branch whereupon, at step 880, the process handles another type of digital assistant command and processing returns to the calling routine (see FIG. 7) at 885.

Figure 9:
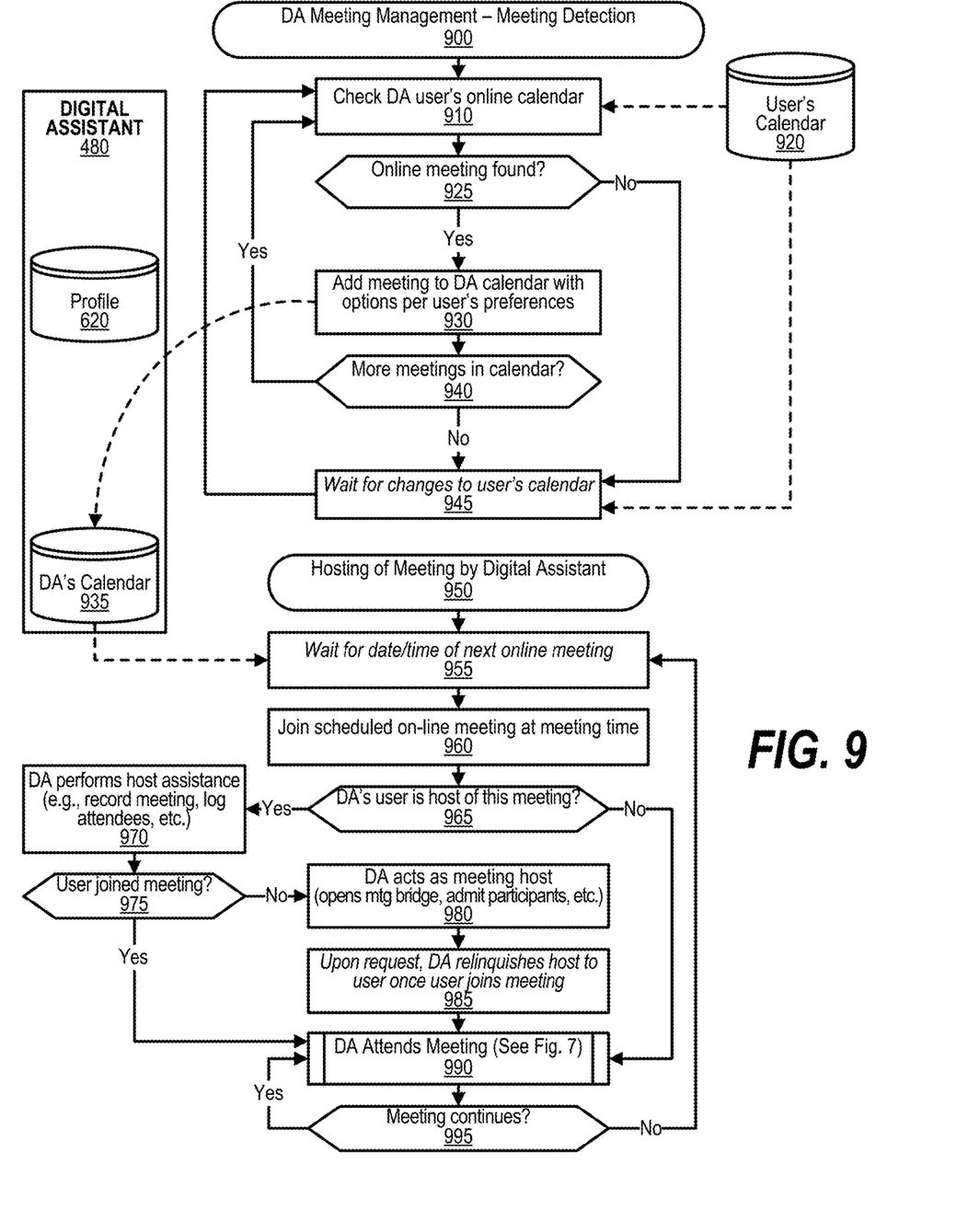
FIG. 9 is a flowchart showing steps taken by a process that detects online meetings from a user's calendar as well as hosting of the online meeting by a digital assistant.

FIG. 9 is a flowchart showing steps taken by a process that detects online meetings from a user's calendar as well as hosting of the online meeting by a digital assistant. FIG. 9 processing commences at 900 and 950. The process starting at 900 shows the steps taken by a process that detects online meetings from the user's calendar, while the process starting at 950 shows the steps taken by a process that hosts an online meeting by the digital assistant. FIG. 9 processing commences at 910 and shows the steps taken by a process that checks the user's online calendar with the user being the user that is associated with the digital assistant. The user's calendar is retrieved from data store 920.

The process determines as to whether an online meeting was found in the user's calendar (decision 925). If an online meeting found, then decision 925 branches to the 'yes' branch whereupon, at step 930, the digital assistant's calendar is updated with online meeting options as per the user's preferences including whether the digital assistant acts as a proxy for the user if the user is absent from an online meeting. The digital assistant calendar is stored in data store 935 accessible by the digital assistant. On the other hand, if an online meeting was not found, then decision 925 branches to the 'no' branch bypassing step 930 and decision 940. When an online meeting is found in the user's calendar, then the process determines whether there are more online meetings in the user's calendar (decision 940).

If there are more online meetings in the user's calendar, then decision 940 branches to the 'yes' branch which loops back to step 910 to retrieve the other online meetings from the user's calendar. This looping continues until all of the online meetings have been retrieved from the user's calendar, as described above, at which point decision 940 branches to the 'no' branch exiting the loop. At step 945, the process waits for any changes to occur to the user's calendar. When a change is detected, processing loops back to step 910 to check if any online meetings have been added to the user's calendar.

Steps 950 through 995 are performed by a digital assistant that can host an online meeting when the digital assistant's owner is the owner (host) of the meeting and cannot attend the online meeting or otherwise chooses to have the digital assistant host the online meeting. At step 955, the process waits for the scheduled date and time of the next online meeting that was retrieved from the user's calendar as shown in steps 900 through 945. When the scheduled date and time arrive then the hosting process performs step 960 through 995 to possibly host the online meeting. At step 960, the process joins the digital assistant to the scheduled on-line meeting at the online meeting time and date.

The process determines as to whether the digital assistant's user is noted as being the host of this online meeting (decision 965). If the digital assistant's user is the host of this meeting, then decision 965 branches to the 'yes' branch whereupon, at step 970, the digital assistant performs host assistance processes such as keeping a record of the meeting (audio, video, etc.), logging the attendees of the online meeting, etc. On the other hand, if the digital assistant's user is not the host of this meeting, then decision 965 branches to the 'no' branch bypassing steps 970 through 985.

When the digital assistant's owner is the host of the meeting, the process determines whether the user (human participant host) has joined the online meeting (decision 975). If the user has joined meeting and wishes to act as the host, then decision 975 branches to the 'yes' branch bypassing steps 980 and 985. On the other hand, if the user (host) has not joined meeting (or otherwise does not wish to serve as the host), then decision 975 branches to the 'no' branch to perform steps 980 and 985. At step 980, the digital assistant acts as the online meeting host. The host actions depend on the meeting platform but may include opening the meeting bridge, admitting participants to the online meeting, and the like. At step 985, the process, upon request of the digital assistant's owner, relinquishes host control to the digital assistant's user (human participant host) once user joins meeting and, in one embodiment, signifies the user's wish to act as the host of the online meeting.

At predefined process 990, the process performs the Digital Assistant Meeting Attendance routine (see FIG. 7 and corresponding text for processing details). The process repeatedly determines whether the online meeting continues (decision 995). If the meeting continues, then decision 995 branches to the 'yes' branch which loops back to predefined process 990. This looping continues until the meeting is terminated, at which point decision 995 branches to the 'no' branch exiting the loop. Processing then loops back to step 955 to wait for the scheduled date and time of the next online meeting.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The detailed description has been presented for purposes of illustration, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. As used herein, a computer readable storage medium does not include a transitory signal.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While particular embodiments have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to others containing only one such element, even when the same claim includes the introductory phrases "one or more" or "at least one" and indefinite articles such as "a" or "an"; the same holds true for the use in the claims of definite articles.

What is claimed is:

1. A method, implemented by a digital assistant comprising a processor, a memory accessible by the processor, and a network interface connecting the information handling system to a computer network, the method comprising:
   receiving, at the digital assistant, a request to attend an online meeting at a scheduled date and time, wherein the digital assistant is associated with one of a plurality of users invited to attend the online meeting;
   automatically logging the digital assistant onto the online meeting over the computer network in response to the scheduled date and time corresponding to a current date and time;
   during the online meeting, detecting, by the digital assistant, a voice command from a selected one of a plurality of human participants of the online meeting, wherein the voice command is detected as being directed to the digital assistant, and wherein the selected human participant is not the user associated with the digital assistant;
   performing, by the digital assistant, a function corresponding to the detected voice command in response to the voice command being within a scope of available digital assistant actions; and
   delivering an error message to the participants of the online meeting in response to determining that the detected voice command is outside the scope of available digital assistant actions.

2. The method of claim 1 further comprising:
   in response to determining that the detected voice command is an application control request, the function performed comprises:
      accessing an application corresponding to the application control request, wherein the application is an application accessible by the user associated with the digital assistant; and
      instructing, by the digital assistant, the accessed application to perform an action corresponding to the detected voice command.

3. The method of claim 2 wherein the application is a display application that currently displaying a portion of a document to the plurality of human participants via a collaboration area of the online meeting, the method further comprising:
   changing the portion of the document that is currently displaying based on the detected voice command.

4. The method of claim 2 wherein the application is a calendar application that corresponds to the user associated with the digital assistant, the method further comprising:
   performing, by the digital assistant, a calendar action using a set of calendar data from the calendar application, wherein the calendar action is based on the detected voice command; and
   audibly informing the plurality of human participants of the calendar action using a synthesized voice of the digital assistant.

5. The method of claim 1 further comprising:
   in response to determining that the detected voice command is an display request, the function performed comprises:
      retrieving, by the digital assistant, a document referenced by the detected voice command; and
      surfacing, by the digital assistant, the document to a collaboration area included in the online meeting, wherein the surfacing makes the document visible to the human participants of the online meeting.

6. The method of claim 5 wherein the user corresponding to the digital assistant is not a human participant of the online meeting and wherein the document is stored on a storage device inaccessible to the human participants, the method further comprising:
   retrieving, by the digital assistant, the document from the storage device that is accessible by the digital assistant.

7. A digital assistant that is an information handling system comprising:
   one or more processors;
   a memory coupled to at least one of the processors;
   a network interface that connects the information handling system to a computer network; and
   a set of computer program instructions stored in the memory and executed by at least one of the processors in order to perform actions comprising:
      receiving, at the digital assistant, a request to attend an online meeting at a scheduled date and time, wherein the digital assistant is associated with one of a plurality of users invited to attend the online meeting;
      automatically logging the digital assistant onto the online meeting over the computer network in response to the scheduled date and time corresponding to a current date and time;
      during the online meeting, detecting, by the digital assistant, a voice command from a selected one of a plurality of human participants of the online meeting, wherein the voice command is detected as being directed to the digital assistant, and wherein the selected human participant is not the user associated with the digital assistant;
      performing, by the digital assistant, a function corresponding to the detected voice command in response to the voice command being within a scope of available digital assistant actions; and delivering an error message to the participants of the online meeting in response to determining that the detected voice command is outside the scope of available digital assistant actions.

8. The information handling system of claim 7 wherein the actions further comprise:

in response to determining that the detected voice command is an application control request, the function performed comprises:

accessing an application corresponding to the application control request, wherein the application is an application accessible by the user associated with the digital assistant; and instructing, by the digital assistant, the accessed application to perform an action corresponding to the detected voice command.

9. The information handling system of claim 8 wherein the application is a display application that currently displaying a portion of a document to the plurality of human participants via a collaboration area of the online meeting, wherein the actions further comprise:

changing the portion of the document that is currently displaying based on the detected voice command.

10. The information handling system of claim 8 wherein the application is a calendar application that corresponds to the user associated with the digital assistant, wherein the actions further comprise:

performing, by the digital assistant, a calendar action using a set of calendar data from the calendar application, wherein the calendar action is based on the detected voice command; and audibly informing the plurality of human participants of the calendar action using a synthesized voice of the digital assistant.

11. The information handling system of claim 7 wherein the actions further comprise:

in response to determining that the detected voice command is an display request, the function performed comprises:

retrieving, by the digital assistant, a document referenced by the detected voice command; and surfacing, by the digital assistant, the document to a collaboration area included in the online meeting, wherein the surfacing makes the document visible to the human participants of the online meeting.

12. The information handling system of claim 11 wherein the user corresponding to the digital assistant is not a human participant of the online meeting and wherein the document is stored on a storage device inaccessible to the human participants, wherein the actions further comprise:

retrieving, by the digital assistant, the document from the storage device that is accessible by the digital assistant.

13. A computer program product comprising:

a computer readable storage medium, comprising computer program code that, when executed by an information handling system, executes a digital assistant that performs actions comprising:

receiving, at the digital assistant, a request to attend an online meeting at a scheduled date and time, wherein the digital assistant is associated with one of a plurality of users invited to attend the online meeting;

automatically logging the digital assistant onto the online meeting over the computer network in response to the scheduled date and time corresponding to a current date and time;

during the online meeting, detecting, by the digital assistant, a voice command from a selected one of a plurality of human participants of the online meeting, wherein the voice command is detected as being directed to the digital assistant and wherein the selected human participant is not the user associated with the digital assistant;

performing, by the digital assistant, a function corresponding to the detected voice command in response to the voice command being within a scope of available digital assistant actions; and delivering an error message to the participants of the online meeting in response to determining that the detected voice command is outside the scope of available digital assistant actions.

14. The computer program product of claim 13 wherein the actions further comprise:

in response to determining that the detected voice command is an application control request, the function performed comprises:

accessing an application corresponding to the application control request, wherein the application is an application accessible by the user associated with the digital assistant; and instructing, by the digital assistant, the accessed application to perform an action corresponding to the detected voice command.

15. The computer program product of claim 14 wherein the application is a display application that currently displaying a portion of a document to the plurality of human participants via a collaboration area of the online meeting, wherein the actions further comprise:

changing the portion of the document that is currently displaying based on the detected voice command.

16. The computer program product of claim 14 wherein the application is a calendar application that corresponds to the user associated with the digital assistant, wherein the actions further comprise:

performing, by the digital assistant, a calendar action using a set of calendar data from the calendar application, wherein the calendar action is based on the detected voice command; and audibly informing the plurality of human participants of the calendar action using a synthesized voice of the digital assistant.

17. The computer program product of claim 13 wherein the actions further comprise:

in response to determining that the detected voice command is an display request, the function performed comprises:

retrieving, by the digital assistant, a document referenced by the detected voice command; and surfacing, by the digital assistant, the document to a collaboration area included in the online meeting, wherein the surfacing makes the document visible to the human participants of the online meeting.

\* \* \* \* \*